May 2, 1967 D. H. COOPER ETAL 3,316,849
SELF-PRIMING, DIRECT CURRENT PUMP-MOTOR
Filed July 15, 1965 3 Sheets-Sheet 1
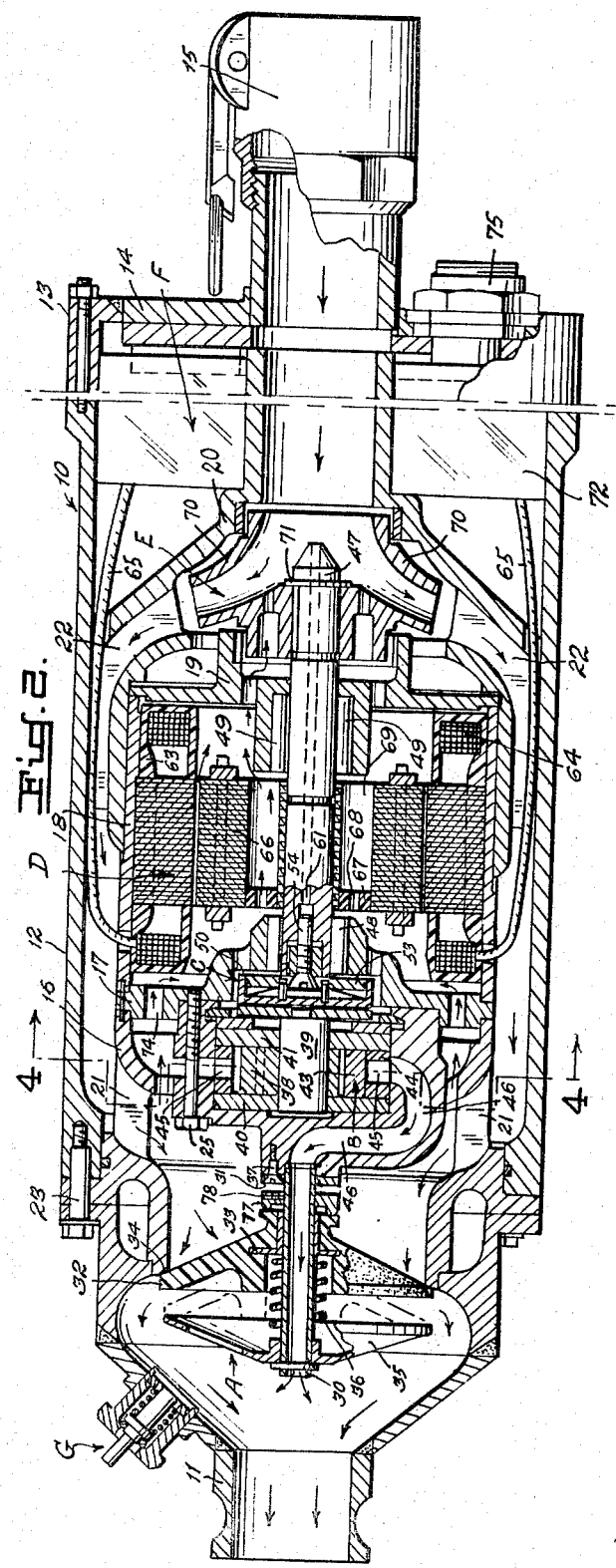
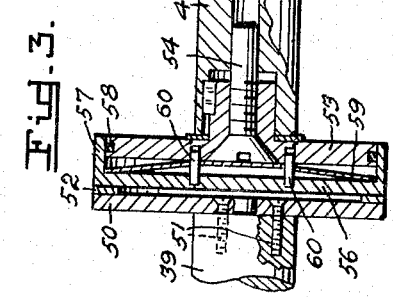
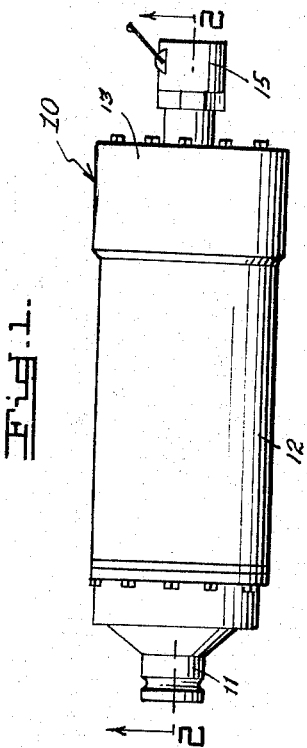
INVENTORS,
D. H. Cooper
A. J. Humphrey
John D. Edick
Charles S. Reasby May 2, 1967  D. H. COOPER ETAL  3,316,849
SELF-PRIMING, DIRECT CURRENT PUMP-MOTOR
Filed July 15, 1965  3 Sheets-Sheet 2

INVENTORS,
D. H. Cooper
A. J. Humphrey
John D. Edick
Charles S. Reasby

May 2, 1967 D. H. COOPER ET AL 3,316,849
SELF-PRIMING, DIRECT CURRENT PUMP-MOTOR
Filed July 15, 1965 3 Sheets-Sheet 3
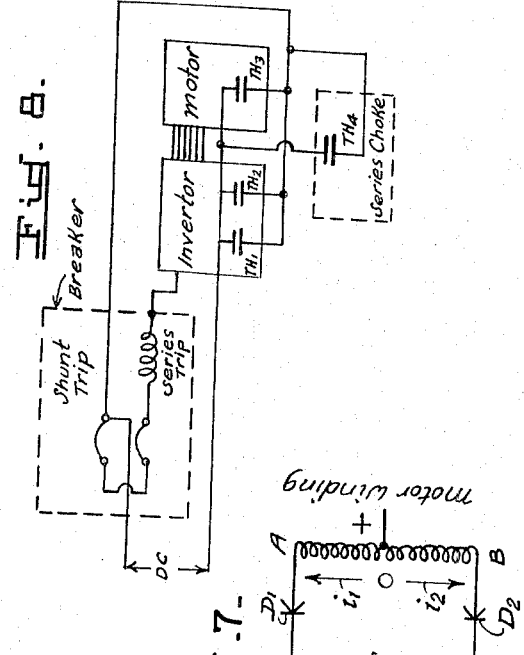
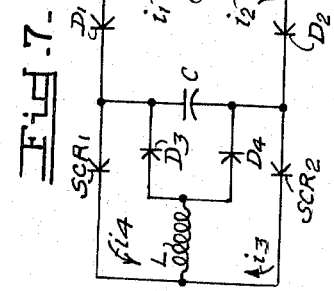
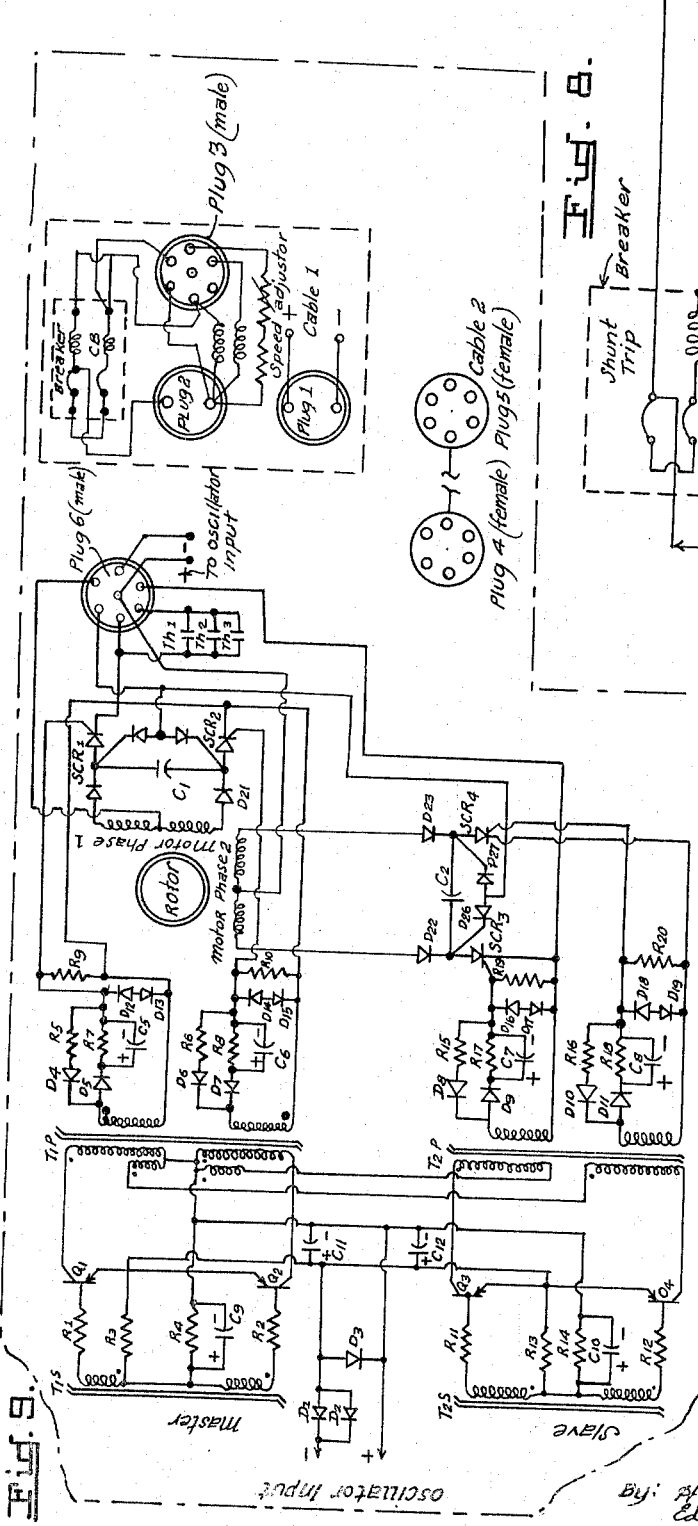
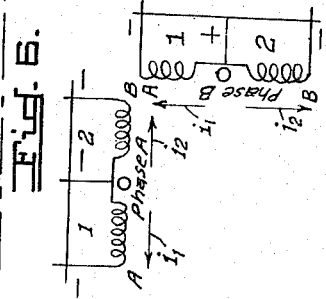
INVENTORS,
D. H. Cooper
A. J. Humphrey
John D. Edick
Charles S. Reasby
By: Harry M. Saragovitz,
Edward J. Kelly &
Herbert Berl

United States Patent Office 3,316,849
Patented May 2, 1967

3,316,849
SELF-PRIMING, DIRECT CURRENT
PUMP-MOTOR
Donald H. Cooper, Berkeley Heights, N.J., John D. Edick, Wickliffe, Andrew J. Humphrey, Cleveland, Ohio, and Charles S. Reasby, Worcester, Mass., assignors, by direct and mesne assignments, to the United States of America as represented by the Secretary of the Army
Filed July 15, 1965, Ser. No. 472,374
6 Claims. (Cl. 103—113)

This invention relates to a self-priming, direct current pump-motor and more particularly to the combination of a submersible polyphase induction motor, a solid state inverter, a vaned diffuser centrifugal pump, a sliding vane type vacuum pump, a spring loaded check valve, a spring actuated pressure released friction clutch and a pressure relief valve to achieve a self priming pump-motor capable of operating fully submerged in hydrocarbon fluids and capable of operation by a direct current power source.

Mobility of troops in the field is keyed to the use of vehicles and aircraft which consume hydrocarbon fuels. These fuels are transferred from service facilities in forward areas to these vehicles and aircraft by lightweight, compact dispensing kits consisting of hose reels, meters, filter and/or separators, and self-priming pumps.

It is therefore a primary object of this invention to provide a pump-motor powered by the low voltage direct current available on military vehicles and aircraft and filled and cooled by hydrocarbon fuel and having an essentially unidirectional flow path from pump suction through pump-motor to pump discharge, the entire pump-motor being capable of submergence in the hydrocarbon fuel thereby making possible the placement of the pump-motor inside the filter and/or separator vessel and reducing the bulk of the dispensing kit.

Another object is to incorporate a spring actuated, pressure released friction clutch between the respective shafts of the motor and priming pump whereby, when priming is completed, the priming pump is disengaged, thereby eliminating the parasitic power of the priming pump when not in use.

A further object is to provide a pump-motor capable of both wet and dry operation.

A still further object is to provide a pump-motor free of electrical or mechanical sparking.

A final object is to provide a pump-motor protected for overtemperature and overload, and capable of continuous, full load operation when cooled by the pumped fuel.

Variations and modifications may be effected without departing from the scope of the novel concept of the present invention.

In the drawings:

FIG. 1 is a side elevation of the self priming, direct current pump-motor of the invention;

FIG. 2 is an axial section taken along line 2—2 of FIG. 1;

FIG. 3 is an enlarged sectional detail of the clutch;

FIG. 6 is a wiring diagram showing the motor winding as connected to the inverter switching stage;

FIG. 7 is a wiring diagram of one of the power commutating and switching circuit of one of the two phases of the inverter;

FIG. 8 is a wiring diagram of the overload and overtemperature protection; and,

FIG. 9 is a schematic wiring of the complete power and commutating stages of the electric system in its entirety.

Figure 4:
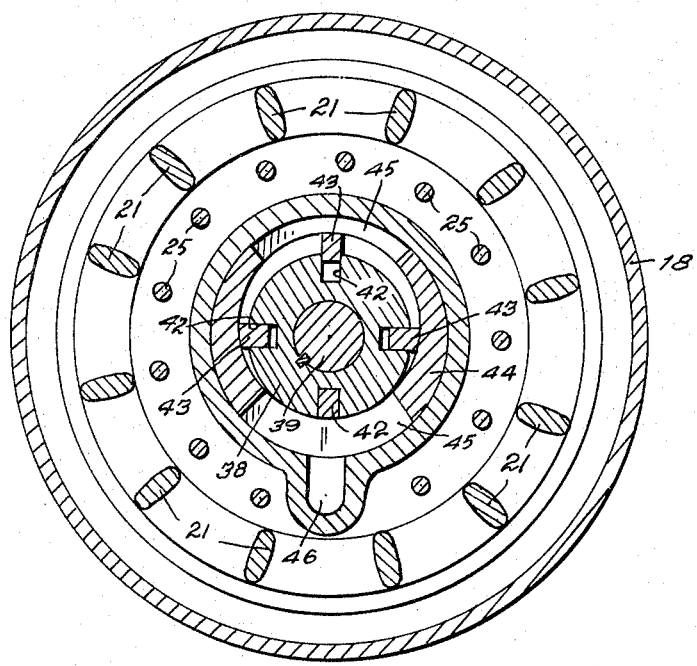
FIG. 4 is a cross sectional view taken along line 4—4 of FIG. 2.

Referring now to the drawings:

Reference character 10 indicates the pump-motor generally.

The pump motor 10 is housed entirely within a composite housing the components of which are welded and bolted together. The sections consist essentially of a flange nozzle casing 11, a diffuser housing 12, an inverter housing 13, and an end plate 14. End plate 14 is provided with a quick coupler 15 integral axially therewith.

Further components of the pump motor-housing are, a vane pump casing 16 which is bolted to a forward bearing housing 17, a motor housing 18, a rearward bearing housing 19 and an impeller housing 20.

Vane pump casing 16 and elements 17–20 are coaxially arranged within housing 12.

Motor housing 18 is connected to the diffuser housing 12 by webs 21 arranged circumferentially as seen in FIG. 4, while impeller housing 20 is similarly provided with webs 22 as seen in FIG. 2.

Flange housing 11 is bolted to diffuser housing 12 by bolts 23 and end plate 14 is bolted to diffuser housing 12 by bolts 24.

Vane pump casing 16 is bolted to bearing housing 17 by bolts 25.

The principal operating components of the pump-motor are: a check valve assembly A, a sliding vane type vacuum pump B, a spring-loaded friction clutch C, an induction motor D, a centrifugal pump E, an inverter F and a pressure relief valve G.

CHECK VALVE

The check valve assembly A comprises a tubular valve guide 30 which is secured axially to the vane pump casing 16 by a flange 31 which is secured to casing 16 by screws 37.

A check valve 32 of pliable material, such as rubber, has a bushing 33 imbedded therein and the bushing slides on valve guide 30.

Check valve 32 seats on a conical seat 34 formed on casing 16, as view in FIG. 2.

A conical deflector 35 is fixed on the downstream side of the valve assembly A and a coil spring 36 encircling tubular guide 30 between member check valve 32 and deflector 35, normally urges check valve 32 towards a closed position in the valve assembly A.

An adjustable seal 77 is secured on tubular guide 30 by a screw 78 and acts both as a seal for check valve 32 and a limit stop for preventing the check valve 32 from being drawn into the diffuser housing 12 by excess suction in the pump system.

VACUUM PUMP

The sliding vane type vacuum pump indicated generally by B consists of a slotted rotor 38 mounted on an axially disposed shaft 39 which is rotatably mounted in a pair of side plates 40 and 41 in casing 16.

Rotor 38 is provided with slots 42 (see FIG. 4) and carbon graphite vanes 43 are slidably mounted in slots 42. The rotor 38 and vanes 43 rotate in an eccentric stator 44. Vanes 43 will slide in slots 42 when the rotor 38 rotates. Vanes 43 are sealed at their tips by centrifugal force, trapping air between specially placed and sized eccentric stator ports 45 and causing the entrapped air to be discharged through cored passage 46 in casing 16 to check valve assembly A.

A manually operated pressure relief valve, indicated by G, is provided in the flange nozzle casing 11 to permit venting of the vacuum pump discharge to the atmosphere and to thereby avoid a back pressure build up in the pump motor discharge system during priming.

CLUTCH

A second axially disposed shaft 47 is mounted in the pump system and a clutch assembly, indicated by C, is mounted on shafts 39 and 47, as seen in FIG. 2. Shaft 47 is journaled in the forward and rearward bearing housings 17 and 19 by bearings 48 and 49 respectively. Shaft 47 is driven by an induction motor D.

The clutch assembly C per se is best viewed in FIG. 3 which is an enlarged view thereof and consists of a clutch plate 50 mounted on, and in axial alignment with, shaft 39 by radially offset screws 51 and bears clutch friction face 52.

A driver plate 53 is mounted on, and in axial alignment with, shaft 47 by a screw 54 and is secured against rotation by a key 55.

A pressure plate 56 abuts the clutch lining 52 and has an annular, integral flange 57 and receives driven plate 53 which is slidable therein. An O-ring 58 seals between the flange 57 and the outer peripheral surface of driven plate 53.

A Belleville spring 59 is disposed between pressure plate 56 and driver plate 53 and normally biases pressure plate 56 against clutch lining 52.

Guide pins 60 seated in pressure plate 56 and slidable in driven plate complete the clutch assembly.

The Belleville spring 59 produces the engagement force necessary for torque to drive the vacuum pump B. The pressure differential which appears across the centrifugal pump E, when fully primed, is communicated to pressure plate 56 by ports 45 and a central bore 61 in shaft 47. The differential pressure acts to displace pressure plate 56 axially away from clutch plate 50 thus disengaging the clutch and stopping the vane pump.

The Belleville spring 59 is vital to this concept for two reasons. First, it generates considerable force on the limited force available. Second, it can be proportioned to give variable spring rate desired.

MOTOR

The motor D has a laminated stator 62 encapsulated in a fluid resistant resin 63 and is wound as at 64 to work in company with the inverter F by cables 65.

The rotor of the motor is indicated by 66 and is also laminated and is encapsulated in a resin as indicated at 67. The motor is cooled by a portion of the pump flow which is bled off and recirculated from vacuum pump B end to main impeller balance holes 68 and suitably sized ducts 69, and ports 70 in bearing housing 19.

Motor D is a two phase, four pole squirrel cage induction type and is provided with two identical windings (see FIG. 6 for the schematic). Current is switched alternately through windings 1 and 2 in each phase as indicated by the current arrows. This switching action generates an alternating field in each phase and when phase B is switched 90 electrical degrees after phase A, the two phases combine to produce a rotating field in the air gap. This resultant flux induces currents in the rotor winding which interact with flux to produce torque and turn shaft 47.

The duplicate motor winding is connected to the inverter F switching stage as shown in FIG. 6.

CENTRIFUGAL PUMP

The centrifugal pump is indicated generally by E and comprises an impeller having four blades 70 (two being shown in FIG. 2). The impeller is mounted on shaft 47 and is rotated by the pump motor D. Key 71 insures rotation of the impeller on shaft 47. The flow of the liquid to be pumped is indicated by the flow arrows. The diffuser housing 12 surrounds the motor D and directs the flow at the vacuum pump end and into the check valve A cavity.

INVERTER

Figure 5:
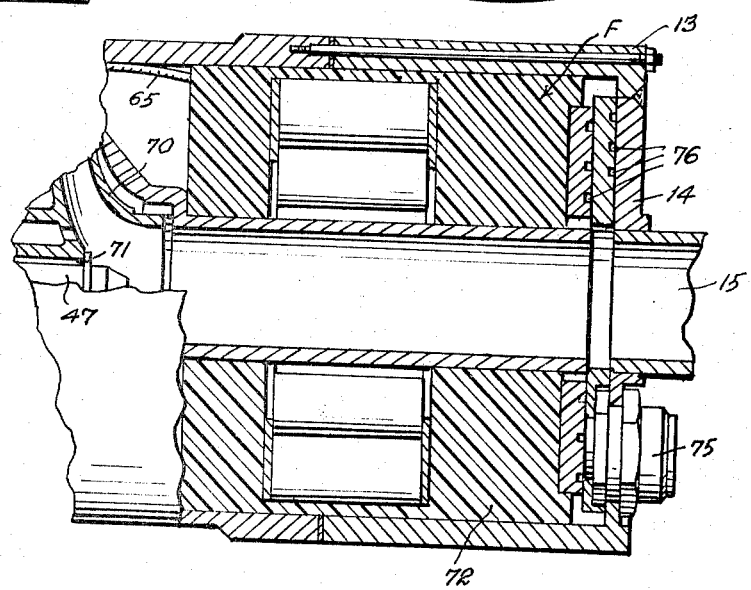
FIG. 5 is a fragmentary axial section of the inverter end of the pump-motor.

The inverter is indicated by F and is a two phase, self forced commutating, 180° conduction, full wave parallel design. The inverter F is encapsulated in resin 72 (see FIG. 2) and consists of an oscillator, a commutating condenser bank and a switching stage, which function in combination with the special stator winding in the motor D to produce a rotating flux wave in the motor air gap which induces torque in the motor rotor. The motor winding 64 serves the dual function of transforming the direct current pulses sent to it by the inverter switching stage and of establishing the rotating air gap flux wave. Electrical losses developed in the switching stage are dissipated to the fluid being pumped through heated sinks 73, which are grooved plates on which the electrical components are mounted. (See FIG. 5.)

The active elements of the inverter are four silicon controlled rectifiers (SCR) backed up by silicon diodes for, (a) isolating commutating capacitors, and (b) returning reactive energy to a battery. Both motor-inverter phases are identical except for time relationship of their respective firing pulses; in operating principle each works as a single phase, full wave parallel inverter. FIG. 7 shows the power commutating and switching circuit of one such phase.

No current flows in the motor winding 64 until the SCR's are triggered to fire. Capacitor C is uncharged. The oscillator sends a firing pulse to $SCR_1$. Current $i_1$ now builds up through motor winding OA and choke L. This changing current (flux in motor core) induces a voltage in OB such that B is positive to A. Since current is flowing in $D_1$ and $SCR_1$, they appear as a conducting path to voltage AB. Since B is positive, capacitor C charges through $D_1$ and $D_2$ to the maximum voltage appearing across AB; the lower half of the capacitor is now positive. 180 electrical degrees after $SCR_1$ is fired, $SCR_2$ is triggered by a firing pulse from the oscilllator. Immediately capacitor discharge current $i_3$ flows between $SCR_1$ and $SCR_2$; the time for this current to build up is very small due to low inductance of the circuit between $SCR_1$ and $SCR_2$. This current $i_3$ is in opposition to the current, $i_1$ which had been flowing in $SCR_1$ up to the instant $SCR_2$ was fired. When the net current in $SCR_1$, $i_1-i_3$ falls to zero, $SCR_1$ ceases to conduct. Some reverse current may flow in $SCR_1$ while junctions clear, but the action of the capacitor is to commutate (turn off) $SCR_1$ upon firing of $SCR_2$.

The instant $SCR_1$ stops conducting an inverse (reverse) voltage appears across it; diode $D_3$ in series with choke L now carries capacitor discharge current and limits this inverse voltage. The capacitor now recharges in the opposite polarity to a voltage above battery potential by virtue of the fact that its remaining charge is in series with both battery and winding voltages. This higher charge voltage allows smaller capacitor to commutate (switch conduction) the SCR's. This voltage builds up in 8 to 10 cycles after starting and is limited by resistances in the charging circuit and by the energy consumed in turn-off of the outgoing SCR.

The function of a separate choke L in each phase is to isolate the two phases so that commutation in one will not, (a) trigger SCR's in the other or, (b) turn off SCR's in the other.

Four firing pulses, equally spaced in time, are needed to control the two phase inverter These are supplied by a master slave oscillator (see FIG. 3). Four outputs, one for each SCR, are shown connected to SCR gates.

Overload and short circuit protection are provided by a timed, magnetic circuit breaker with two separate trip free poles. D.-C. load current goes through contacts on each of the poles (see FIG. 8) and actuates a series trip coil in one of the poles. The short duration high starting (inrush) currents passing through this series trip coil do not cause breaker to open due to time delay feature. However, after time delay period passes, the trip coil will open breaker at currents of between 110 and 125 amperes. 100 amperes is the continuous rating.

Overtemperature protection is provided by a shunt trip coil which is activated whenever any of four normally open thermostatic switches ($Th_1$–$Th_4$) close on sensing an excessive temperature. These switches are located in the motor winding 64 (close at 195° F.) and in the SCR heat sinks 76 of both inverter phases (close at 175° F.). A fourth normally open thermal switch set to close at 350° F. is located on one of the series chokes in control box 26. The breaker will not make contact if one or more of the thermal switches (Th₁–Th₄) are closed due to excessive temperature. Thus pump 10 cannot be started when winding 64, SCR or choke L temperatures are at an unsafe value. A plug receptacle is provided as at 75 for connection to a vehicle source of D.C. current, such as a battery.

OPERATION

The solid state inverter F converts direct current supplied to it through hermetic receptacle 75 to alternating current in stator winding 64 of induction motor D which, in turn, produces rotation and torque in rotor 66 and which rotates shaft 47. Shaft 47 then rotates centrifugal pump E's impeller blades 70. Also vacuum pump's slotted rotor 38, on shaft 39, is rotated through clutch C. (Check valve A is closed during this stage by spring 36.)

Gases are drawn, by vacuum pump B, from pump, motor and suction line volume and discharges through the check valve A's system to the downstream side of closed check valve member 32. During this period the pressure relief valve G is opened by the operator to prevent back pressure to build up at the vacuum pump discharge. This evacuation continues to the point where pressure difference across vane pump B is great enough to have forced liquid in the suction lines (see arrows in FIG. 2).

At this point the centrifugal pump E is primed and, provided discharge line is open to fluid flow, check valve A opens and the pump is in full operation.

The pressure differential of the fully primed pump is communicated to pressure plate 56 of clutch C by bore 61 in shaft 47 and holes 74 in forward bearing housing 17 which acts to displace the pressure plate 56 axially away from clutch plate 50, thus disengaging the clutch A and stopping the vacuum pump B.

The gases from the suction action of the vacuum pump B are discharged to the downstream side of the check valve A and are vented through the relief valve G to prevent pressure build up.

It is apparent that an improved pump, filled and cooled by hydrocarbon fuel, capable of self-priming and submersible in liquids, has been devised. All components are housed in a common enclosure, and the inverter being removed a distance from the motor has provided greater cooling of the operating elements. It is also apparent that the inverter circuitry could be removed from the pump motor inclosure and located at some point remote from the pump motor, for example, with the controls for the pump motor, if desired. Such relocation would, of course, considerably reduce the size and weight of the pump motor itself while also permitting easier access to the inverter circuitry for maintenance and repair purpose.

Variations and modifications may be effected without departing from the scope of the novel concept of the present invention as set forth in the appended claims.

What is claimed is:

1. A self-priming, self-cooling, direct current pump-motor for pumping hydrocarbon fuels comprising in combination, a tubular outer housing, closed at its upstream side and converging to form a nozzle at its downstream side, a tubular inner housing having a diameter smaller than said outer housing and secured entirely within said outer housing whereby an annular space is formed between said outer and inner housings, said inner housing converging to a smaller diameter at its downstream side, and having an inlet connected to its upstream side, said inlet being in communication with said annular space, a valve assembly mounted axially to the downstream side of said inner housing and adapted to normally close the downstream side of said annular space, a first shaft mounted axially in said inner housing, a vacuum pump mounted for rotation with said first shaft, a second shaft mounted in axial alignment with said first shaft in said inner housing, a clutch assembly mounted axially between said first and second shafts in said inner housing and normally being in engaged position whereby said shafts are rotated simultaneously, an alternating current, induction motor mounted medially in said inner housing, said motor having a stator encapsulated in an insulating material and a rotor adapted to drive said second shaft, a centrifugal pump mounted on the upstream end of said second shaft and disposed between said annular space and said inlet, an electrical current inverter carried by the upstream end of said outer housing and surrounding said inlet, said inverter being encapsulated in an insulating material and being in electrical communication with said stator of said induction motor and an electrical outlet in the upstream side of said housing and being in electrical connection with said inverter, said inverter converting direct current supplied through said outlet into alternating current in said induction motor, said induction motor, when energized, adapted to rotate said second shaft to rotate said vacuum pump and said centrifugal pump to evacuate said pump-motor of gases and to pump hydrocarbon fuels into said inlet through said annular space respectively and through said nozzle whereby said inverter, said induction motor, said clutch assembly and said vacuum pump are cooled by the fuel being pumped.

2. In a pump-motor as set forth in claim 2 wherein said valve assembly comprises an axially disposed, tubular guide fixed to the downstream end of said inner housing, said guide communicating between said vacuum pump and the downstream side of said housings, there being a conical valve seat formed on the downstream face of said inner housing, a conical resilient valve member slidably mounted on said valve guide, a conical deflector for said valve member fixed to the downstream end of said valve guide and arranged in opposed relation with respect to said valve member, and a coil spring encircling said valve guide and normally biasing between said valve member and said deflector to urge said valve member to seat on said valve seat when said pump-motor is dry and to open when said pump-motor is fully primed.

3. In a pump-motor as set forth in claim 2 wherein said vacuum pump comprises an eccentric stator carried by said inner housing, there being ports in said stator communicating between said annular space and the downstream side of said valve assembly, a rotor fixed to said first shaft for rotation in said stator, there being a series of radial slots in the outer periphery of said rotor and a vane slidable in each slot and normally contacting the inner peripheral surface of said eccentric stator when activated by centrifugal force.

4. In a pump-motor as set forth in claim 2 wherein said clutch assembly comprises a clutch plate fixed axially to one end of said first shaft and having a lining secured thereon, a driver plate slidably mounted on one end of said second shaft, a pressure plate disposed between said clutch plate and said pressure plate, said pressure plate having an annular flange on its face opposite said clutch plate and adapted to receive said driver plate in slidable relation therein, and a Belleville spring disposed between said pressure plate and said driver plate, said Belleville spring normally urging said pressure plate towards said clutch plate, there being a central bore in said second shaft and a series of openings in said inner housing whereby the differential pressure across said centrifugal pump, when fully primed, is communicated to said pressure plate to urge said pressure plate away from said clutch plate and stop rotation of said vacuum pump.

5. In a pump-motor as set forth in claim 2 wherein said centrifugal pump comprises a series of hollow impeller blades mounted on the upstream side of said second shaft, each said blade being in communication with said annular space between said housings and said inlet.

6. A self-priming, self-cooling, direct current pump-motor for pumping hydrocarbon fuels comprising in combination, a tubular outer housing, closed at its upstream side and converging to form a nozzle at its downstream side, a tubular inner housing having a diameter smaller than said outer housing and secured entirely within said outer housing whereby an annular space is formed between said outer and inner housings, said inner housing converging to a smaller diameter at its downstream side, and having an inlet connected to its upstream side, said inlet being in communication with said annular space, a valve assembly mounted axially to the downstream side of said inner housing and adapted to normally close the downstream side of said annular space, a first shaft mounted axially in said inner housing, a vacuum pump mounted for rotation with said first shaft, a second shaft mounted in axial alignment with said first shaft in said inner housing, a clutch assembly mounted axially between said first and second shafts in said inner housing and normally being in engaged position whereby said shafts are rotated simultaneously, an alternating current, induction motor mounted medially in said inner housing, said motor having a stator encapsulated in an insulating material and a rotor adapted to drive said second shaft, a centrifugal pump mounted on the upstream end of said second shaft and disposed between said annular space and said inlet, an electrical current inverter, said inverter being encapsulated in an insulating material and being in electrical communication with said stator of said induction motor and an electrical outlet in the upstream side of said housing and being in electrical connection with said inverter, said inverter converting direct current supplied through said outlet into alternating current in said induction motor, said induction motor, when energized, adapted to rotate said second shaft to rotate said vacuum pump and said centrifugal pump to evacuate said pump-motor of gases and to pump hydrocarbon fuels into said inlet through said annular space respectively and through said nozzle whereby said induction motor, said clutch assembly and said vacuum motor are cooled by the fuel being pumped.

References Cited by the Examiner

UNITED STATES PATENTS

| 2,440,947 | 5/1948 | Hart | 103—87 |
| 2,520,880 | 8/1950 | Hatlamoff | 103—87 |
| 2,952,214 | 9/1960 | Adams | 103—113 |

FOREIGN PATENTS

| 450,752 | 8/1948 | Canada. |
| 693,258 | 6/1953 | Great Britain. |

DONLEY J. STOCKING, *Primary Examiner.*

HENRY F. RADUAZO, *Examiner.*